Figure 1:
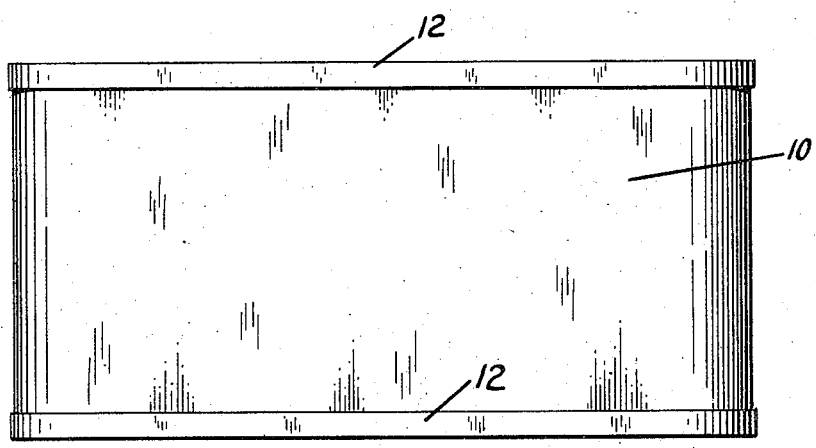

H. A. WELTON & H. J. HOYT.
APRON FOR RUBBER MIXING MILLS.
APPLICATION FILED JAN. 19, 1916.

1,201,406.

Patented Oct. 17, 1916.

WITNESS:
S. G. Taylor

INVENTORS
H. A. Welton,
and H. J. Hoyt
BY
Ernest Hopkinson
THEIR ATTORNEY

UNITED STATES PATENT OFFICE.

HARRY A. WELTON AND HOMER J. HOYT, OF DETROIT, MICHIGAN, ASSIGNORS TO MORGAN & WRIGHT, A CORPORATION OF MICHIGAN.

APRON FOR RUBBER-MIXING MILLS.

1,201,406. Specification of Letters Patent. Patented Oct. 17, 1916.

Application filed January 19, 1916. Serial No. 72,920.

*To all whom it may concern:*

Be it known that we, HARRY A. WELTON and HOMER J. HOYT, both citizens of the United States, and residents of the city of Detroit, county of Wayne, State of Michigan, have invented certain new and useful Improvements in Aprons for Rubber-Mixing Mills, of which the following is a full, clear, and exact description.

This invention relates to aprons for rubber mixing mills and has for an object to provide an apron having superior wearing qualities and superior displacement-resisting qualities.

In connection with rubber mixing mills, endless aprons are used for the purpose of carrying material from beneath the mixing rolls back into the batch above the rolls and in addition the apron serves to compact the accumulated rubber on the front mixing roll. The apron runs over two rollers beneath the mixing rolls and a third roller in advance of and above the axis of the front mixing roll, the latter roller being yieldably held to move outwardly and inwardly toward the mixing roll, as well as upwardly and downwardly, to permit of the apron accommodating itself to the load upon it and to the outline of the material on the front mixing roll. Obviously, such an apron is subjected to severe flexing, shocks, strains, changes of shape, etc.

Usually an apron of this class is built of flat plies of rubber treated material and vulcanized in flat condition. As a result, when the apron changes its shape to pass over its supporting rollers, the outer ply is stretched, and the inner ply compacted, a disintegrating action being thus set up, which results in separation of the plies. This separation is enhanced by the changes of shape, shocks, strains, etc., to which the apron is continuously subjected.

An object of the present invention is therefore, to provide an apron which will be vulcanized and thus the material set in such condition that each point longitudinally of the apron changes in direction from its neighbor so that the apron will be in normal, unstrained condition while passing over the supporting rollers.

Furthermore, in the usual rubber mixing mill apron, there is employed a guide rib on the inner surface, which fits in a corresponding groove in the apron-supporting rollers, and prevents sidewise shifting of the apron off of the rollers. This rib is unsatisfactory, because, running as it does over smaller circumferences than the apron, it quickly becomes loose and therefore worthless in properly performing its function.

A further object of the invention is therefore to provide an apron which dispenses with this rib, and to attain this end, the invention provides an apron which is thicker at the edges than at the portions therebetween so that the apron will stretch more at the center than at the stiffened edges and thus may accommodate itself to varying loads, etc., without disturbing the tension of the edge portions. As a result, the apron is maintained at all times centered with respect to its supporting rollers.

The invention can be readily understood from the following description taken in connection with the accompanying drawing, in which—

Figure 2:
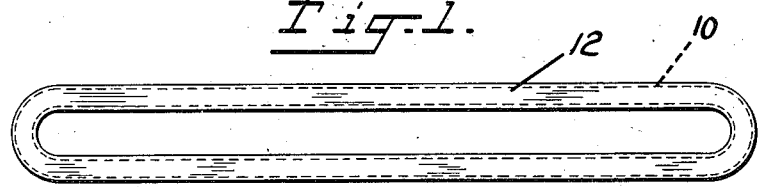
Figure 4:
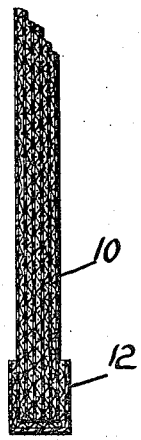
Figure 3:
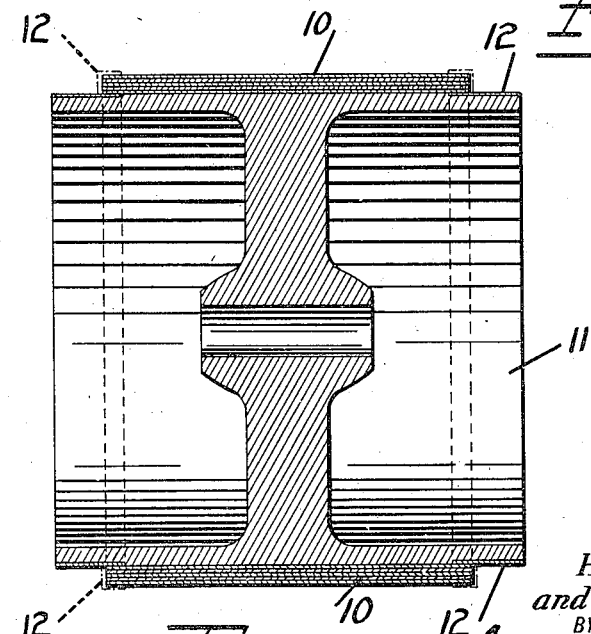

Figure 1 is a plan view of an apron constructed in accordance with the invention; Fig. 2 is a side elevation of the apron shown in Fig. 1; Fig. 3 is a sectional view showing the cylindrical drum upon which the apron is vulcanized with the apron thereon in the process of construction; Fig. 4 is an enlarged fragmentary sectional view showing the reinforced edge construction of the apron.

In carrying out the invention, the apron is formed by winding a continuous web 10 of rubber treated fabric in a plurality of convolutions upon a cylinder 11. Preferably the material is canvas frictioned with rubber on one side and skim-coated with rubber on the other, so that in the resultant product there exists alternate layers of canvas bonded or united to each other by layers of vulcanized rubber.

Preferably, prior to winding of the web upon the drum, a pair of narrow strips 12 of the same material as the web, are wound in a single convolution upon the edge portions of the drum. The strips are so positioned that upon subsequent winding of the web upon the drum, they will overlap at the inner edge portion, the first laid convolution, as clearly shown in Fig. 3. After completion of the winding of the web upon the drum, the strips 12 are bent up over the edges of the convolutions and then rolled down upon the outer surface of the last laid convolution.

To complete the process, the drum with the apron built thereon, as above described, is put in a vulcanizer and the apron is there subjected to a sufficient temperature for a sufficient length of time to complete the desired degree of vulcanization of the rubber.

As a result of vulcanizing the apron upon a cylindrical drum, each point longitudinally of the apron changes in direction from its neighbor, that is, the apron becomes set or fixed normally in an annular shape, which shape is most advantageous to permit of the apron passing over its supporting rollers on the mixing mill, without the above described disintegrating action, so detrimental to the life of mixing aprons. Furthermore, as shown by the present embodiment, the apron will have a greater number of plies of material at the edges than at the portions therebetween, consequently, the body of the apron can stretch readily in adapting itself to the load upon it, while the reinforced edge portions maintain their normal tension. As a result of this construction it has been found that the apron so constructed will ride in centralized position upon its supporting rollers, without the use of the usual centering guide ribs or other devices. Finally the strips 12 by being placed astride of the edge portions of the apron, form binding strips which prevent the usual starting of separation of the plies at the edge portions of the apron, and thus, in conjunction with the permanent set of the apron in annular condition during vulcanization, promote longer life and greater durability in the apron than in ordinary aprons.

Having thus described our invention, what we claim and desire to protect by Letters Patent is:

1. An apron for rubber mixing mills comprising plies of fabric united by rubber vulcanized in annular shape, said apron having a greater number of plies at the edge portions than at the portions therebetween.

2. An apron for rubber mixing mills comprising plies of fabric united by vulcanized rubber, and binding strips disposed astride of and united to the edge portions of the apron, and constituting additional plies at the edges of the apron.

3. An apron for rubber mixing mills comprising plies of fabric united by vulcanized rubber, and plies of fabric united by vulcanized rubber to the edge portions of the apron.

4. The process of manufacturing aprons for rubber mixing mills consisting of forming a plurality of convolutions of rubber treated fabric lightly adhering to each other, placing astride of the edge portions of said convolutions strips of rubber treated material which lightly adhere to said convolutions, and subjecting the product to vulcanization while maintaining the shape of the convolutions.

5. The process of manufacturing aprons for rubber mixing mills consisting of winding upon each edge portion of a cylindrical drum, a strip of rubber treated material, winding a plurality of convolutions of rubber treated material to overlap said strips, directing said strips to embrace the edge portions of said convolutions, and subjecting the product on said drum to a sufficient degree of heat for a sufficient period of time to effect the desired vulcanization of the rubber.

Signed at Detroit, county of Wayne, State of Michigan, this 12th day of January 1916.

HARRY A. WELTON.
HOMER J. HOYT.